US011010829B2

(12) United States Patent
Maitra et al.

(10) Patent No.: US 11,010,829 B2
(45) Date of Patent: May 18, 2021

(54) LIQUIDITY MANAGEMENT SYSTEM

(71) Applicant: Accenture Global Solutions Limited, Dublin (IE)

(72) Inventors: Anutosh Maitra, Bangalore (IN); Shubhashis Sengupta, Bangalore (IN); Abhisek Mukhopadhyay, Shyamnagar (IN); Shilpi Jain, New Delhi (IN); Sarabjit Singh Gugneja, Gujarat (IN); Leonardo Orlando, London (GB)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/450,783

(22) Filed: Jun. 24, 2019

(65) Prior Publication Data

US 2020/0402156 A1 Dec. 24, 2020

(51) Int. Cl.
*G06Q 40/02* (2012.01)

(52) U.S. Cl.
CPC .................................. *G06Q 40/02* (2013.01)

(58) Field of Classification Search
CPC ........ G06Q 10/00; G06Q 20/00; G06Q 30/00; G06Q 40/00; G06Q 40/02
USPC ...................................................... 705/3–44
See application file for complete search history.

(56) References Cited

U.S. PATENT DOCUMENTS

| | | | | |
|---|---|---|---|---|
| 7,761,379 B2* | 7/2010 | Zoldi | ..................... | G06Q 30/06 705/44 |
| 8,090,648 B2* | 1/2012 | Zoldi | ..................... | G06Q 10/10 705/38 |
| 8,407,148 B2* | 3/2013 | Yoder | ..................... | G06Q 30/02 705/64 |
| 8,554,653 B2* | 10/2013 | Falkenborg | ........ | G06Q 30/0255 705/35 |
| 8,600,873 B2* | 12/2013 | Fisher | ................ | G06Q 10/0635 705/38 |
| 8,620,798 B2* | 12/2013 | Faith | ..................... | G06Q 20/40 705/35 |
| 8,639,567 B2* | 1/2014 | Winters | ............. | G06Q 30/0255 705/14.1 |

(Continued)

OTHER PUBLICATIONS

Siva, Meera, "Data Analytics and You", ProQuest document ID: 1674132131, Apr. 19 (Year: 2015).*

(Continued)

*Primary Examiner* — Frantzy Poinvil
(74) *Attorney, Agent, or Firm* — Harrity & Harrity, LLP

(57) ABSTRACT

A device may determine a behavioral pattern of an account over a past time period based on data relating to one or more transactions associated with the account. The device may identify one or more quantitative features of the behavioral pattern and one or more spatial features of the behavioral pattern. The device may determine an account type cluster to which the account belongs, based on the one or more quantitative features and the one or more spatial features identified. The device may determine, based on the account type cluster that is determined, a model for processing the behavioral pattern. The device may predict, using the model that is determined, an amount of funds that is likely to remain in the account during a future time period. The device may perform one or more actions based on the amount of funds that is predicted.

20 Claims, 7 Drawing Sheets

(56) References Cited

U.S. PATENT DOCUMENTS

| | | | | |
|---|---|---|---|---|
| 8,706,641 | B2* | 4/2014 | Bruesewitz | G06Q 20/403 705/64 |
| 8,725,462 | B2* | 5/2014 | Jain | G16H 40/63 702/187 |
| 8,738,529 | B2* | 5/2014 | Kolhatkar | G06Q 40/00 705/44 |
| 9,818,136 | B1* | 11/2017 | Hoffberg | G06Q 30/0207 |
| 10,163,137 | B2* | 12/2018 | Hoffberg | G06Q 30/0207 |
| 2002/0099649 | A1* | 7/2002 | Lee | G06Q 20/4016 705/38 |
| 2011/0231258 | A1* | 9/2011 | Winters | G06Q 30/0255 705/14.53 |
| 2012/0078697 | A1* | 3/2012 | Carlson | G06Q 20/40 705/14.23 |
| 2013/0124263 | A1* | 5/2013 | Amaro | G06Q 30/02 705/7.34 |
| 2013/0346264 | A1* | 12/2013 | Falkenborg | G06Q 40/10 705/30 |
| 2014/0324677 | A1* | 10/2014 | Walraven | G06Q 20/4016 705/39 |
| 2015/0324783 | A1* | 11/2015 | Desai | G06N 5/046 705/39 |

OTHER PUBLICATIONS

Voelker, Michael P., "Stay a Step Ahead of Fraud—Perpetrators of fraud are changing tactics faster than traditional methods of detection can track . . . " Intelligent Enterprise, San Mateo, vol. 9, Iss. 9, September p. 39-42 (Year: 2006).*

Synechron, "Liquidity Coverage Ratio (LCR) Reporting", https://www.synechron.com/finlabs/artificial-intelligence/liquidity-coverage-ratio-lcr-reporting, Mar. 23, 2017, 4 pages.

* cited by examiner

LIQUIDITY MANAGEMENT SYSTEM

BACKGROUND

A liquidity buffer is a proportion of deposits at a financial institution that the financial institution must hold as capital to ensure an ability to meet short-term obligations. The financial institution may invest capital that is not maintained as the liquidity buffer to generate profit for the financial institution. The Basel Accords, promulgated by the Basel Committee on Bank Supervision, require certain financial institutions to hold a liquidity buffer against 25% of corporate operational deposits (e.g., working capital used by an account holder for day-to-day business operations) and 40% of non-operational corporate deposits (e.g., capital not immediately required for day-to-day business operations of an account holder). Thus, classification of deposits as operational or non-operational may affect the profitability of the financial institution.

SUMMARY

According to some implementations, a method may include determining, by a device, a behavioral pattern of an account over a past time period, wherein the behavioral pattern is determined based on data relating to one or more transactions associated with the account, and wherein the one or more transactions relate to at least one of an inflow of funds to the account or an outflow of funds from the account. The method may include identifying, by the device, one or more quantitative features of the behavioral pattern and one or more spatial features of the behavioral pattern. The method may include identifying, by the device, one or more anomalous transactions that occurred during the past time period, based on the one or more quantitative features and the one or more spatial features identified. The method may include determining, by the device, an account type cluster to which the account belongs, based on the one or more quantitative features and the one or more spatial features identified. The method may include determining, by the device, and based on the account type cluster that is determined, a model for processing the behavioral pattern. The method may include predicting, by the device and using the model that is determined, an amount of funds that is likely to remain in the account during a future time period, wherein the amount of funds is predicted based on the one or more quantitative features, the one or more spatial features, and the one or more anomalous transactions that are identified. The method may include performing one or more actions based on the amount of funds that is predicted.

According to some implementations, a device may include one or more memories and one or more processors, communicatively coupled to the one or more memories, to determine a behavioral pattern of an account over a past time period, wherein the behavioral pattern is determined based on data relating to one or more transactions associated with the account, and wherein the one or more transactions relate to at least one of an inflow of funds to the account or an outflow of funds from the account. The one or more processors may identify one or more quantitative features of the behavioral pattern and one or more spatial features of the behavioral pattern. The one or more processors may determine an account type cluster to which the account belongs, based on the one or more quantitative features and the one or more spatial features; determine, based on the account type cluster that is determined, a model for processing the behavioral pattern. The one or more processors may predict, using the model that is determined, an amount of funds that is likely to remain in the account during a future time period, wherein the amount of funds is predicted based on the one or more quantitative features and the one or more spatial features. The one or more processors may perform one or more actions based on the amount of funds that is predicted.

According to some implementations, a non-transitory computer-readable medium may store one or more instructions that, when executed by one or more processors, may cause the one or more processors to determine a behavioral pattern of an account over a past time period, wherein the behavioral pattern is determined based on data relating to one or more transactions associated with the account, and wherein the one or more transactions relate to at least one of an inflow of funds to the account or an outflow of funds from the account. The one or more instructions may cause the one or more processors to identify one or more quantitative features of the behavioral pattern and one or more spatial features of the behavioral pattern. The one or more instructions may cause the one or more processors to determine a prediction of an amount of funds that is likely to remain in the account during a future time period, wherein the prediction is based on the one or more quantitative features and the one or more spatial features. The one or more instructions may cause the one or more processors to perform one or more actions based on the amount of funds that is predicted.

DETAILED DESCRIPTION

Figure 1:
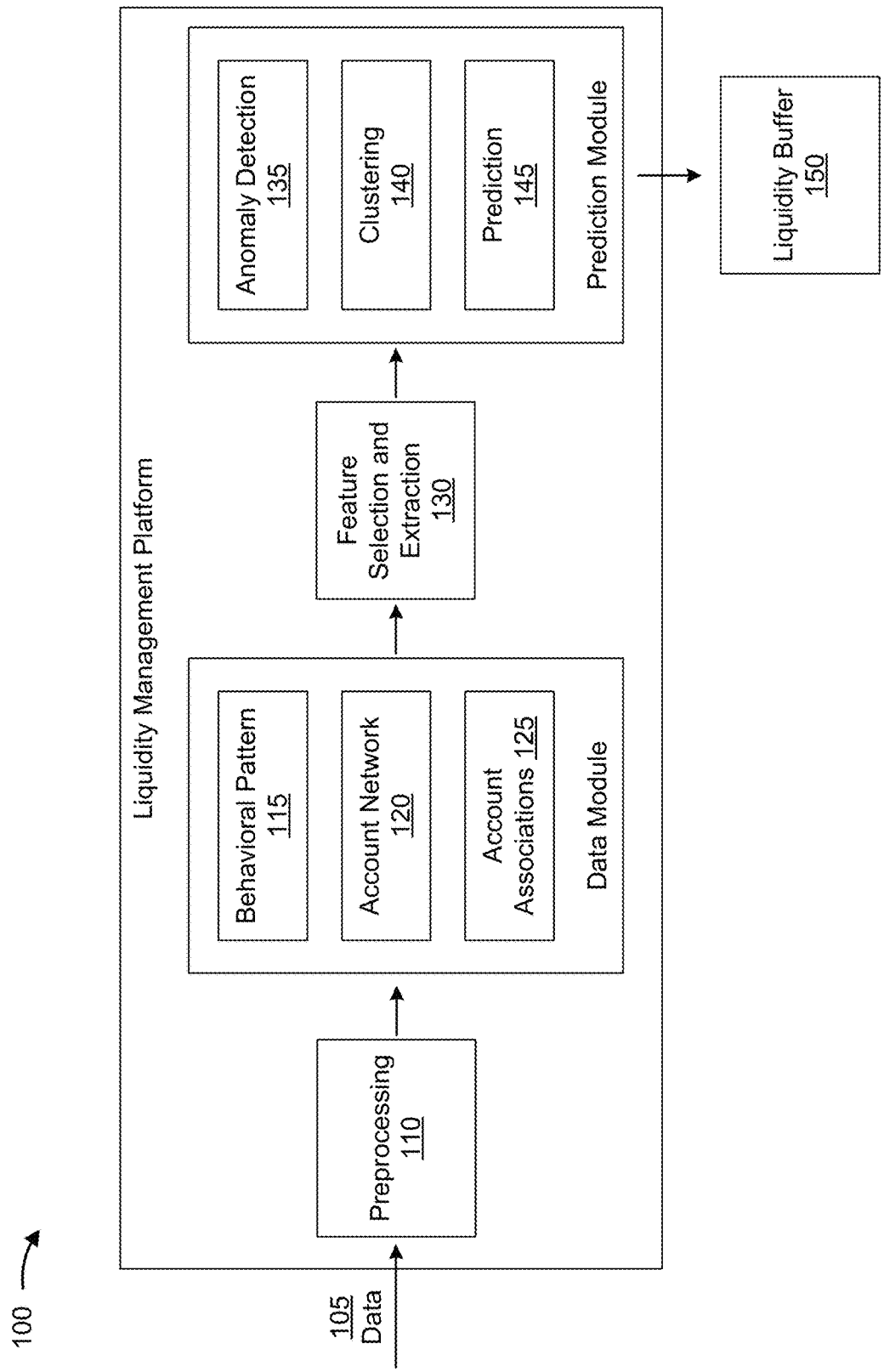
FIG. 1 is a diagram of an example implementation described herein.

The following detailed description of example implementations refers to the accompanying drawings. The same reference numbers in different drawings may identify the same or similar elements.

Traditionally, financial institutions have employed a rule-based approach to classify corporate deposits held by the financial institution as operational or non-operational. For example, according to a rule-based approach, a financial institution may classify an account of an account holder as operational or non-operational based on a length of a relationship between the financial institution and the account holder, a quantity of accounts held by the account holder with the financial institution, a quantity of monthly transactions of the account, and/or the like. This approach may be useful to predict if the account holder is likely to remain a customer of the financial institution, but does not accurately predict whether the account holder is likely to withdraw funds from the account. Accordingly, due to a lack of information, rule-based approaches are unpredictable and unduly broad, thereby resulting in overly-conservative classifications that incorrectly classify operational deposits as non-operational deposits.

Some financial institutions currently employ a data-driven approach to classify corporate deposits held by the financial institution as operational or non-operational. In such a case, the financial institution may employ a forecasting model to predict a future balance of an account. The forecasting model may be used to make a prediction of a future balance of each account maintained by the financial institution, or in some cases, a separate forecasting model may be used for each account maintained by the financial institution. Thus, current forecasting models must make numerous predictions and consume considerable resources (e.g., processor resources, memory resources, and/or the like) since the financial institution may maintain thousands or millions of accounts.

Additionally, the forecasting model may rely on historical data relating to transactions of the account, as well as textual descriptions associated with the transactions to make a prediction. As a result, the forecasting model may fail to account for differences in account use and may be inaccurate or unpredictable. For example, a forecasting model that is able to accurately predict an account balance for a saving account, which has a generally increasing balance over time, may not be suitable for accurately predicting an account balance for a funding account, which has a generally increasing balance over time followed by a sudden withdrawal of all, or substantially all, funds. Furthermore, while forecasting models may learn to differentiate between different account types based on labeling of data or textual descriptions of transactions associated with the different account types, labeling is a time-consuming and inefficient process and textual descriptions are often unavailable or inaccurate.

Moreover, current forecasting models rely on account behavior being predictable (e.g., account behavior that exhibits a trend, a cycle, a seasonality, and/or the like). However, in practice, account behavior is often unpredictable and may include anomalous transactions. As a result, current forecasting models may produce inaccurate or unreliable account balance predictions because anomalous transactions are not taken into account.

Some implementations described herein include a liquidity management platform that provides an improved data-driven approach for predicting a future amount of operational funds that are likely to be held in an account maintained by a financial institution. The liquidity management platform may determine a behavioral pattern of an account based on transactions (e.g., inflows of funds and/or outflows of funds) associated with the account, and identify one or more quantitative features and/or one or more spatial features of the behavioral pattern. Based on the quantitative features and/or the spatial features, the liquidity management platform may determine an account type cluster for the account and may identify anomalous behavior of the behavioral pattern. The liquidity management platform may make a prediction of an amount of funds likely to remain in the account over a future time period using a prediction model associated with the account type cluster, whereby the prediction is based on the quantitative features and/or the spatial features as well as the anomalous behavior identified.

In this way, the liquidity management platform may predict a balance of an account, a quantity of transactions for the account, an amount (e.g., a value) of the transactions, and/or the like over a future time period with improved granularity and accuracy. Moreover, the liquidity management platform is able to identify quantitative and/or spatial features in a behavioral pattern of an account, which may be used to perform account clustering, anomaly detection, forecasting, and/or the like without human-labeled data or textual descriptions of transactions. Accordingly, the liquidity management platform may reduce or eliminate inaccurate prediction due to human-error, mislabeled data, missing data, and/or the like, as well as conserve resources (e.g., processor resource, memory resources, and/or the like) associated with labeling data.

Furthermore, the liquidity management platform facilitates efficient and accurate classification by clustering accounts into account type clusters. For example, the liquidity management platform may use a prediction model that is trained to make predictions in connection with a particular account type (e.g., a saving account type, a payroll account type, and/or the like), thereby improving an accuracy of the predictions. In addition, the liquidity management platform may apply a prediction made for a first account in an account type cluster to a second account in the account type cluster (e.g., based on similarities between accounts in the same account type cluster), thereby improving efficiency and conserving resources that would otherwise be used in making a separate prediction for each account.

FIG. 1 is a diagram of an example implementation 100 described herein. As shown in FIG. 1, a liquidity management platform may include a data module and a prediction module. The liquidity management platform may use the data module to perform an exploratory data analysis (e.g., a statistical analysis) in order to determine behavioral patterns of accounts and/or determine associations among accounts. Furthermore, the liquidity management platform may use the exploratory data analysis of the data module to identify quantitative features and/or spatial features associated with behavioral patterns. The liquidity management platform may use the prediction module to detect anomalies in behavioral patterns, assign accounts to account type clusters, and/or predict future behavior of accounts according to the quantitative features and/or the spatial features identified.

The liquidity management platform may be associated with an entity, such as a financial institution. For example, the liquidity management platform may be implemented by one or more server devices of the financial institution (e.g., as a standalone application or as an application of an internal cloud environment that is accessed via an application programming interface (API)), or one or more server devices accessible to the financial institution (e.g., as an application of an external cloud environment that is accessed via an API). The financial institution may maintain accounts (e.g., bank accounts) for account holders (e.g., customers) with the financial institution. An account holder (e.g., a corporate account holder) may hold a plurality of accounts with the financial institution, which the account holder may use for various purposes. The account holder may transfer or receive funds between the plurality of accounts (e.g., internal to the financial institution), or transfer funds to, or receive funds from, an account maintained by another financial institution (e.g., external to the financial institution).

As shown by reference number 105, the liquidity management platform may obtain data relating to account holders and/or accounts of the financial institution. For example, the liquidity management platform may obtain data that maps account numbers to account holders (e.g., an account holder may be identified by a customer identification number). As another example, the liquidity management platform may obtain data as transaction logs relating to accounts of the financial institution. A transaction log may identify inflows of funds to, and outflows of funds from, an account. For example, the transaction log may identify an inflow of funds and/or an outflow of funds by an amount (e.g., a dollar amount) of the inflow or outflow, a time associated with the inflow or outflow, and/or the like. Thus, the liquidity management platform may obtain a transaction log of an account as a time series.

As shown by reference number 110, the liquidity management platform (e.g., using a preprocessing component) may preprocess the data that is obtained. For example, the liquidity management platform may preprocess the data to organize the data into a particular format (e.g., a comma-separated values format), group the data by a particular time period, group the data by account holder, group the data by account, and/or the like.

As shown by reference number 115, the liquidity management platform (e.g., using a behavioral pattern component of the data module) may determine a behavioral pattern of an account based on the data (e.g., preprocessed data). For example, the liquidity management platform may determine a behavioral pattern of an account based on transactions associated with the account (e.g., one or more inflows of funds to the account and/or one or more outflows of funds to the account). The liquidity management platform may determine the behavioral pattern over a past time period (e.g., 1 year, 3 years, and/or the like). The behavioral pattern may relate to daily increments of the past time period, weekly increments of the past time period, monthly increments of the past time period, and/or the like.

The liquidity management platform may determine a behavioral pattern for an account that relates to a balance of the account. For example, the liquidity management platform may determine a behavioral pattern according to a daily ending balance of an account, a weekly ending balance of the account, a monthly ending balance of the account, and/or the like. Additionally, or alternatively, the liquidity management platform may determine a behavioral pattern for an account that relates to a quantity of transactions of an account. For example, the liquidity management platform may determine a behavioral pattern according to a daily quantity of transactions of an account, a weekly quantity of transactions of the account, a monthly quantity of transactions of the account, and/or the like. Additionally, or alternatively, the liquidity management platform may determine a behavioral pattern for an account that relates to an amount (e.g., a value, such as a dollar value) of transactions of an account. For example, the liquidity management platform may determine a behavioral pattern according to a daily amount of transactions of an account (e.g., by summing inflows of funds and outflows of funds), a weekly amount of transactions of the account, a monthly amount of transactions of the account, and/or the like.

The liquidity management platform may represent the behavioral pattern as a curve (e.g., a time series). The curve may represent a balance of the account over the past time period, a quantity of transactions of the account over the past time period, an amount of the transactions over the past time period, and/or the like. In some implementations, the liquidity management platform may perform a smoothing technique on the curve to permit improved identification of features of the curve.

As shown by reference number 120, the liquidity management platform (e.g., using an account network component of the data module) may determine a network of accounts maintained by the entity (e.g., the financial institution). The network of accounts may identify accounts that are related (e.g., accounts that transact with each other) and a degree of a relationship between related accounts.

The liquidity management platform may determine accounts that are related based on the transaction logs. For example, the liquidity management platform may identify transactions associated with a particular account holder (e.g., a particular customer), and from the transactions associated with the particular account holder, identify an inflow of funds to a first account that corresponds to an outflow of funds from a second account. The inflow may correspond to the outflow if an amount of the inflow and of the outflow is the same, if a time of the inflow and of the outflow is the same, and/or the like. Based on identifying the inflow to the first account that corresponds to the outflow from the second account, the liquidity management platform may determine that the first account and the second account are related. By identifying a plurality of relationships between accounts, the liquidity management platform may determine the network of accounts.

In addition, the liquidity management platform may determine a degree of a relationship (e.g., a degree of interaction) between related accounts. In such a case, the liquidity management platform may determine an inflow set for all inflows of funds to an account and an outflow set for all outflows of funds to the account. In some implementations, transactions that do not satisfy a threshold amount (e.g., $1000) may be excluded from the inflow set and/or the outflow set. The liquidity management platform may determine an outflow strength from a first account to a second account as a quantity of transactions in an intersection set of the outflow set of the first account and the inflow set of the second account, divided by a quantity of transactions in the outflow set of the first account (e.g., outflow strength(first account, second account)=number($\text{outflow}_{first\ account} \cap \text{inflow}_{second\ account}$)÷number($\text{outflow}_{first\ account}$)). Similarly, the liquidity management platform may determine an inflow strength to a first account from a second account as a quantity of transactions in an intersection set of the inflow set of the first account and the outflow set of the second account, divided by a quantity of transactions in the inflow set of the first account (e.g., inflow strength(first account, second account)=number($\text{inflow}_{first\ account} \cap \text{outflow}_{second\ account}$)÷number($\text{inflow}_{first\ account}$)).

In some implementations, the liquidity management platform may determine a network of accounts and/or a degree of a relationship between related accounts using an unsupervised network analysis technique. The network analysis technique facilitates analysis of accounts of a financial institution as a network of accounts with inflows and outflows of funds representing flows across the network. In this way, the liquidity management platform, using the network analysis technique, can determine a network of accounts and/or a degree of a relationship between related accounts without relying upon textual descriptions of the transactions. However, in some implementations, the liquidity management platform may perform a supervised network analysis technique using textual descriptions of the transactions, if textual descriptions are available.

In some implementations, the liquidity management platform may visually represent a network of accounts and/or a degree of a relationship between related accounts. For example, the liquidity management platform may generate a chart, a graph, a table, and/or the like that provides a visual representation of a network of accounts and/or a degree of a relationship between related accounts. The visual representation may be provided in a user interface (e.g., a user interface accessible to the entity associated with the liquidity management platform).

As shown by reference number 125, the liquidity management platform (e.g., using an account associations component of the data module) may determine associations between accounts. For example, the liquidity management platform may associate a first account and a second account as sweep accounts (i.e., funds are transferred back-and-forth between the first account and the second account). As another example, the liquidity management platform may associate a first account as a feeder account to a second account (i.e., the first account transfers funds to the second account). The liquidity management platform may determine the associations in a manner similar to that used by the liquidity management platform to determine accounts that are related. For example, the liquidity management platform may identify transactions associated with a particular account holder (e.g., a particular customer), and from the transactions associated with the particular account holder, identify an inflow of funds to a first account that corresponds to an outflow of funds from a second account and/or an outflow of funds from the first account that corresponds to an inflow of funds to the second account. Based on identifying the inflow to the first account that corresponds to the outflow from the second account and/or the outflow from the first account that corresponds to the inflow to the second account, the liquidity management platform may determine that the first account and the second account are sweep accounts or that the first account is a feeder account to the second account.

In some implementations, the liquidity management platform may visually represent associations between accounts (e.g., as sweep accounts or feeder accounts). For example, the liquidity management platform may generate a chart, a graph, a table, and/or the like that provides a visual representation of associations between accounts. The visual representation may be provided in a user interface (e.g., a user interface accessible to the entity associated with the liquidity management platform).

As shown by reference number 130, the liquidity management platform (e.g., using a feature selection and extraction component) may identify features of a behavioral pattern of an account. For example, the liquidity management platform may identify one or more quantitative features of the behavioral pattern and/or one or more spatial features of the behavioral pattern. A quantitative feature may relate to a quantity of transactions that occurred over a past time period (e.g., a past time period associated with the behavioral pattern), a quantity of inflows of funds that occurred before an outflow of funds occurred during a portion of the past time period (e.g., an average quantity of inflows of funds before an outflow of funds over the past time period), a quantity of outflows of funds that occurred before an inflow of funds occurred during a portion of the past time period (e.g., an average quantity of outflows of funds before an inflow of funds over the past time period), and/or the like. A spatial feature may relate to a slope direction (e.g., a positive slope, a negative slope, or zero slope) over a portion of the behavioral pattern, a slope degree (e.g., a slope) over a portion of the behavioral pattern, a radius of curvature over a portion of the behavioral pattern, and/or the like. For example, the behavioral pattern may include a plurality of data points that can be represented by a curve, and a spatial feature may relate to a slope direction over a portion of the curve, a slope degree over a portion of the curve, a radius of curvature over a portion of the curve, and/or the like.

The liquidity management platform may select a set of the one or more quantitative features and/or the one or more spatial features identified that characterize the behavioral pattern. In other words, the selected set of the one or more quantitative features and/or the one or more spatial features may represent a pattern (e.g., a signature) that identifies the behavioral pattern and/or identifies an account type to which the behavioral pattern belongs. The liquidity management platform may select the set of the one or more quantitative features and/or the one or more spatial features using a test of significance. For example, the liquidity management platform may select a quantitative feature or a spatial feature for inclusion in the set based on determining that the quantitative feature or the spatial feature can identify the behavioral pattern, and/or an account type to which the behavioral pattern belongs, at a threshold level of statistical significance.

In some implementations, the liquidity management platform may identify features of a behavioral pattern that characterize an association of the behavioral pattern with a particular account holder, that characterize an association of the behavioral pattern with a particular account type, that characterize an association of the behavioral pattern with a particular transactional trend, and/or the like. In some implementations, the liquidity management platform may identify features from a network of accounts and/or from associated accounts, such as a degree of a relationship between related accounts, accounts that most frequently transact with one another, accounts that least frequently transact with one another, and/or the like. In such a case, the liquidity management platform may further characterize a behavioral pattern, and/or an account type to which the behavioral pattern belongs, according to the features identified from the network of accounts and/or from the associated accounts.

In this way, the liquidity management platform can characterize an account and/or an account type without labels and according to non-textual features of the account and/or the account type, thereby improving the efficiency and accuracy of account balance predictions, as described below.

As shown by reference number 135, the liquidity management platform (e.g., using an anomaly detection component of the prediction module) may identify anomalous behavior (e.g., one or more anomalous transactions) that occurred during a past time period (e.g., the past time period associated with the behavioral pattern). In other words, the liquidity management platform may identify a portion (e.g., a 5-day period, a 15-day period, a 30-day period, and/or the like) of the past time period when the anomalous behavior occurred. The liquidity management platform may identify the anomalous behavior based on the one or more quantitative features and/or the one or more spatial features that are identified.

In some implementations, the liquidity management platform may identify the anomalous behavior by identifying deviations in the behavioral pattern from an expected behavior (e.g., based on statistical modeling). For example, the liquidity management platform may determine moving standard deviation values (e.g., a measure of volatility) for a balance of an account over a past time period (e.g., the past time period associated with the behavioral pattern). Continuing with the previous example, the liquidity management platform may determine a z-score (i.e., a standard score) for each of the standard deviation values, and may identify anomalous behavior at a time point associated with a z-score that satisfies a threshold value (e.g., two standard deviations, three standard deviations, and/or the like). In some implementations, the liquidity management platform may determine a time window associated with anomalous behavior by adding and/or subtracting a configurable time period (e.g., 5 days, 15 days, 30 days, and/or the like) to the time point. The time point and/or the time window may be correlated (e.g., based on time) to the behavioral pattern, and/or to a time series of balances of the account, in order to identify the anomalous behavior.

The anomalous behavior may relate to one or more anomalous transactions. For example, an anomalous transaction may include an inflow of funds to an account, or an outflow of funds to the account, that is larger or smaller (e.g., larger or smaller to a degree of statistical significance or larger or smaller by a threshold amount) than an expected inflow or outflow of the account. Such anomalous transactions may occur because of seasonal factors (e.g., a merchant may experience higher sales revenue due to holiday shopping), cyclical factors (e.g., a merchant may purchase new inventory according to a schedule or pay bonuses according to a schedule), policy factors (e.g., a financial institution may modify interest rates for certain accounts), regulatory factors (e.g., a government may introduce new regulations applicable to certain accounts), and/or the like.

In some implementations, the liquidity management platform may provide information identifying the anomalous behavior (e.g., a visual representation of the anomalous behavior, such as a graph) to the account holder or the entity to permit the account holder or the entity to provide a business reason (e.g., in a form of a label) for the anomalous behavior. For example, the entity may label anomalous behavior occurring in December as seasonal behavior due to holiday shopping. Additionally, the account holder or the entity may label (e.g., classify) an account balance coinciding with the anomalous behavior as operational or non-operational. Anomalous behavior and business reasons for the anomalous behavior may be incorporated into a prediction model to permit the prediction model to forecast future anomalous behavior, as described below.

As shown by reference number 140, the liquidity management platform (e.g., using the clustering component of the prediction module) may determine an account type cluster to which an account belongs based on the behavioral pattern associated with the account. In this way, the liquidity management platform facilitates clustering of behaviorally-similar accounts.

In some implementations, the liquidity management platform may determine an account type cluster for an account using an unsupervised pattern recognition technique. For example, the liquidity management platform may use a k-means clustering technique with dynamic time warping as a distance metric and/or a k-shape clustering technique to determine an account type cluster for an account based on time-varying behavior of the account (e.g., one or more quantitative features and/or one or more spatial features identified from a behavioral pattern associated with the account). In some implementations, the liquidity management platform may determine an account type cluster for an account, additionally, or alternatively, based on other features of the account, such as an average monthly balance, an average monthly quantity of transactions, an average inflow transaction amount, an average outflow transaction amount, and/or the like.

The liquidity management platform may normalize a behavioral pattern of an account prior to performing a clustering technique. For example, the liquidity management platform may rescale a behavioral pattern to have zero mean standard deviation and zero unit standard deviation.

In some implementations, after clusters are formed and identified (e.g., labeled), accounts (e.g., new accounts) may be classified using a supervised classification technique (e.g., using labeled clusters as a training data set). An account type cluster may be labeled by the entity according to a purpose of accounts in the account type cluster (e.g., payroll accounts). Labeling of an account type cluster may facilitate a set of rules, as described below, being assigned to the account type cluster. The prediction model, as described below, may be trained using information identifying the purposes of accounts in the account type clusters, which may result in improved account balance prediction.

An account type cluster may relate to a payroll account, a funding account, a volatile account, a saving account, and/or the like, whether labeled as such or based on behavioral patterns that characterize these accounts. A payroll account may be characterized by a steady balance, followed by a steep drop in balance (e.g., at bimonthly or monthly intervals), and followed by a steep increase in balance back to, or near, the steady balance. A funding account (e.g., an account for funding a venture) may be characterized by a steadily increasing balance that is followed by a steep drop in balance (e.g., when the funding occurs). A volatile account may be characterized by regular, and random, inflows of funds and outflows of funds. A saving account may be characterized by a steadily increasing balance.

The account type clusters described above are illustrative and are not intended to be an exhaustive list. Moreover, the liquidity management platform may identify new account type clusters for accounts exhibiting behavioral patterns that do not correspond to existing account type clusters.

As shown by reference number 145, the liquidity management platform (e.g., using a prediction component of the prediction module) may predict an amount of funds (e.g., a balance) that is likely (e.g., with a level of confidence that satisfies a threshold value, such as 50%, 75%, 90%, and/or the like) to remain in an account during a future time period (e.g., 30 days, 90 days, and/or the like), a quantity of transactions for the account during the future time period, an amount (e.g., a value) of the transactions, and/or the like. In this way, the liquidity management platform may classify funds in an account as operational or as non-operational according to the amount of funds, the quantity of transactions, and/or the amount of the transactions predicted.

In some implementations, the liquidity management platform may perform a prediction for an account using an unsupervised prediction model. The liquidity management platform may select the prediction model for the account based on an account type cluster to which the account belongs. For example, the liquidity management platform may train a prediction model for each account type cluster using data relating to accounts that belong in the account type cluster. Such data may include data relating to behavioral patterns (e.g., quantitative features and/or spatial features) of the accounts of the cluster, data relating to anomalous behavior of the accounts of the cluster, data relating to relationships or associations between accounts of the cluster, and/or the like. In this way, the prediction model is trained specifically for the account type cluster to which the account belongs, thereby producing predictions having improved accuracy.

The prediction model may be an autoregressive integrated moving average (ARIMA) model, an artificial intelligence model (e.g., a deep learning model, such as a recurrent neural network), a forecasting model (e.g., an additive model where non-linear trends are fit with yearly, weekly, and daily seasonality, as well as holiday effects, such as Facebook Inc.'s Prophet forecasting model), and/or the like. In some implementations, the liquidity management platform may employ one, or a combination, of the aforementioned prediction models to perform a prediction. When a combination of prediction models is employed, the liquidity management platform may aggregate (e.g., average) respective predictions of the prediction models.

The liquidity management platform may select a particular prediction model that is to be used based on a nature of the account type cluster. For example, the liquidity management platform may select an ARIMA model when the account type cluster is associated with accounts having behavioral patterns exhibiting cyclical behavior. As another example, the liquidity management platform may select a forecasting model (e.g., the Prophet forecasting model) when the account type cluster is associated with accounts having behavioral patterns exhibiting abrupt deviations from a particular pattern. As a further example, the liquidity management platform may select a recurrent neural network model when the account type cluster is associated with accounts having behavioral patterns exhibiting random and/or erratic behavior.

In some implementations, the liquidity management platform, or another device, may train the prediction model to predict an account balance of an account based on features relating to a behavioral pattern of the account, such as quantitative features and/or spatial features, as described above. For example, the prediction model may be trained with historical data relating to behavioral patterns of accounts. In addition, the prediction model may be trained with historical data relating to anomalous behavior, relationships or associations between accounts, and/or the like. The prediction model may predict for an account an amount of funds, a quantity of transactions, and/or an amount of the transactions during a future time period based on one or more quantitative features and/or one or more spatial features of a behavioral pattern of the account. Based on the amount of funds, the quantity of transactions, and/or the amount of the transactions, the liquidity management platform may classify funds in the account as operational (e.g., likely to remain in the account) or as non-operational (e.g., not likely to remain in the account).

In some implementations, the liquidity management platform may predict that anomalous behavior is likely to occur during the future time period. In such a case, the prediction model of the liquidity management platform may predict that anomalous behavior is likely to occur during the future time period based on previous anomalous behavior identified by the liquidity management platform. For example, the prediction model may predict that anomalous behavior is likely to occur during the future time period based on previous seasonal and/or cyclical anomalous behavior. As another example, the prediction model may predict that anomalous behavior is likely to occur during the future time period based on previous policy-caused and/or regulatory-caused anomalous behavior. In such a case, the liquidity management platform may obtain, and provide to the prediction model, data from external data sources, such as data relating to scheduled policy updates, regulatory updates, and/or the like. Such external data sources may include one or more server devices associated with the entity.

In some implementations, the liquidity management platform may provide information identifying likely anomalous behavior (e.g., a time window of a future time period associated with the anomalous behavior) to the account holder or the entity to permit the account holder or the entity to classify (or reclassify) an account balance associated with the likely anomalous behavior as operational or as non-operational. Additionally, or alternatively, based on identifying anomalous behavior that is likely to occur during a future time period, the liquidity management platform may classify an account balance as non-operational during the future time period. Additionally, or alternatively, based on identifying anomalous behavior that is likely to occur during a future time period and a degree of the anomalous behavior, the liquidity management platform may classify a portion of an account balance (e.g., a portion that is equivalent to the degree of the anomalous behavior) as non-operational during the future time period.

In some implementations, the prediction model may predict an amount of funds, a quantity of transactions, and/or an amount of the transactions during a future time period that accounts for anomalous behavior that is likely to occur during the future time period. For example, the prediction model may predict a degree by which the anomalous behavior is likely to affect the amount of funds, the quantity of transactions, and/or the amount of the transactions during the future time period. Continuing with the previous example, the prediction model may adjust a prediction of the amount of funds, the quantity of transactions, and/or the amount of the transactions based on the degree that is predicted.

In some implementations, the liquidity management platform may determine a prediction for a first account in an account type cluster and apply the prediction to a second account in the account type cluster. For example, if a balance of the second account is within a threshold amount of a balance of the first account, the liquidity management platform may apply the prediction for the first account to the second account. As another example, the liquidity management platform may determine a ratio of a balance of the first account to a balance of the second account, and apply the prediction for the first account, scaled by the ratio, to the second account. In this way, the liquidity management platform may determine a prediction for one account in an account type cluster and apply the prediction to the remaining accounts in the account type cluster, thereby conserving resources that would otherwise be used determining predictions for each account in the account type cluster.

As shown by reference number 150, predictions of the liquidity management platform may be used to determine a liquidity buffer for the entity. The liquidity management platform may provide information identifying a prediction (e.g., an amount of funds that is likely to remain in an account) to the entity (e.g., to a user device of the entity). Based on a plurality of predictions of the liquidity management platform, the entity may determine a liquidity buffer based on a set of rules. The set of rules may be determined by the entity, or in some cases, may be determined by a regulatory body.

In some implementations, predictions for accounts may be aggregated based on the set of rules. For example, the set of rules may prescribe that a first account and a second account that are associated as sweep accounts are to be treated as a single account (e.g., predictions for the first account and the second account may be aggregated). As another example, the set of rules may prescribe that a first account that is a feeder account to a second account is to be treated as a part of the second account (e.g., a prediction for the first account may be combined with a prediction for the second account). In this way, the set of rules may rely on associations between accounts, as described above, to determine whether a prediction applies only to an account for which the prediction was made or whether the prediction applies to multiple accounts that are associated.

The set of rules also may prescribe when an amount of funds predicted is to be treated as operational or as non-operational. For example, the set of rules may prescribe that an amount of funds predicted to remain in an account that is in a payroll account type cluster is to be treated as operational. As another example, the set of rules may prescribe that if a quantity of transactions predicted for an account satisfies a threshold value, an amount of funds predicted to remain in the account is to be treated as operational. As a further example, the set of rules may prescribe that balance predictions for accounts belonging to certain account type clusters (e.g., a saving account type cluster or a funding account type cluster) are to be treated as operational.

In some implementations, the set of rules may prescribe when an amount of funds predicted is to be treated as operational or non-operation based on anomalous behavior. For example, the set of rules may prescribe that an amount of funds associated with recurring anomalous behavior (e.g., anomalous behavior identified as occurring every January) is to be treated as operational and an amount of funds associated with non-recurring anomalous behavior (e.g., anomalous behavior identified as occurring due to new regulatory policy) is to be treated as non-operational.

In some implementations, the liquidity management platform may be configured with the set of rules. In such a case, after determining account balance predictions, the liquidity management platform may determine a liquidity buffer for the entity based on the account balance predictions and the set of rules. In some cases, the liquidity management platform may transmit a notification to a user device of the entity that identifies the determined liquidity buffer. Additionally, or alternatively, the liquidity management platform may transmit a notification to a user device of the entity that identifies an amount of funds by which the entity must increase held capital to satisfy the determined liquidity buffer, identifies an amount of funds by which the entity may decrease held capital while satisfying the determined liquidity buffer, and/or the like.

In this way, the liquidity management platform facilitates determination of a liquidity buffer with improved accuracy and efficiency, thereby conserving resources and permitting a financial institution to operate with improved efficiency.

As indicated above, FIG. 1 is provided merely as an example. Other examples may differ from what is described with regard to FIG. 1.

Figure 2:
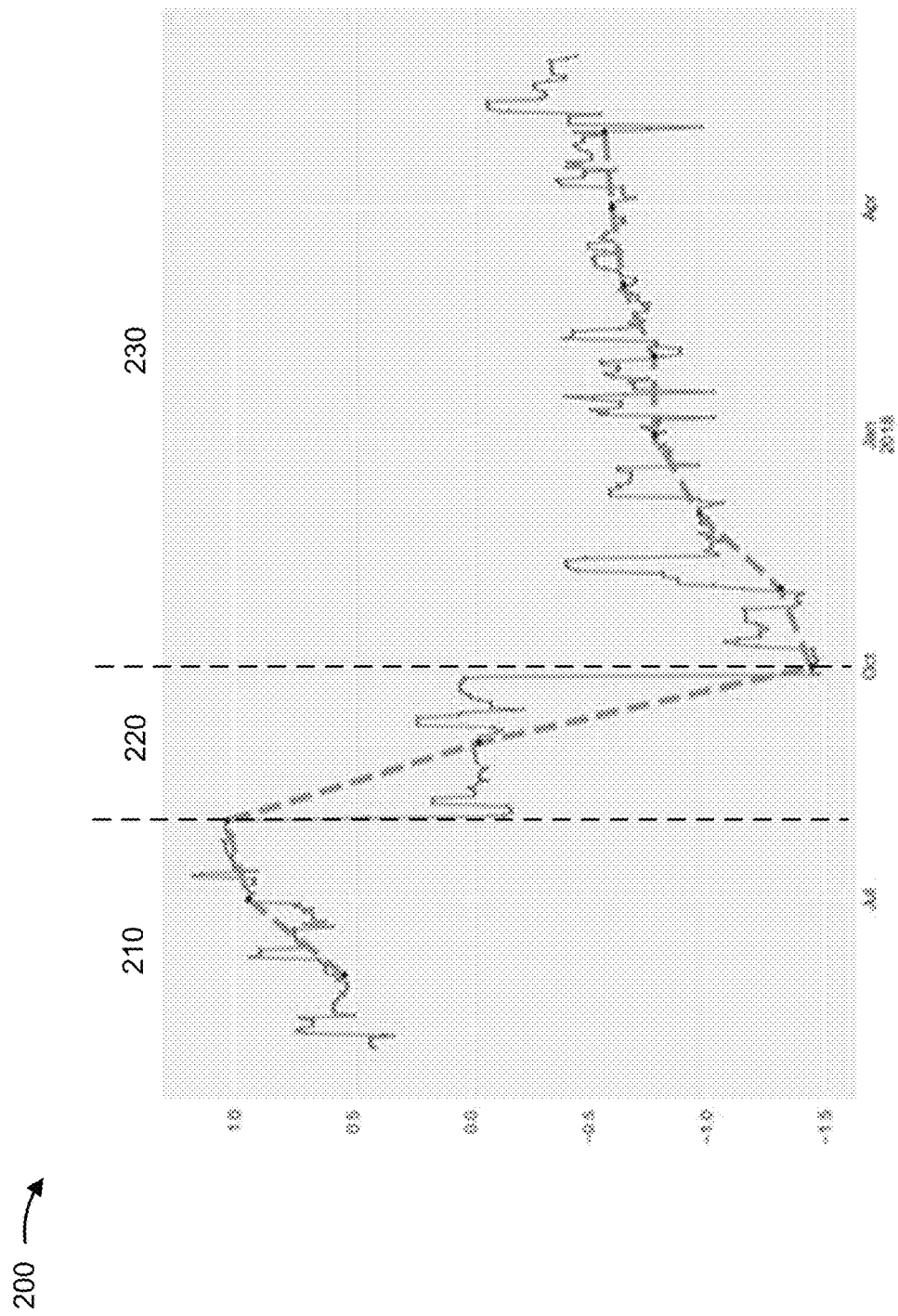
FIG. 2 is a diagram of an example representation of a behavioral pattern of an account.

FIG. 2 is a diagram of an example representation of a behavioral pattern 200 that may be determined and processed by the liquidity management platform. Behavioral pattern 200 relates to a balance of an account over a past time period (e.g., a one year past time period). As shown in FIG. 2, behavioral pattern 200 may be represented as a curve (shown in solid line) and a smoothing technique may be applied to the curve to produce a smoothed curve (shown in broken line) that may better identify trends in behavioral pattern 200.

Behavioral pattern 200 may be characterized by one or more spatial features. As shown by reference number 210, spatial features of behavioral pattern 200 may include a positive slope that is gradual. As shown by reference number 220, additional spatial features of behavioral pattern 200 may include a negative slope that is steep. As shown by reference number 230, additional spatial features of behavioral pattern 200 may include a positive slope that is gradual.

In the case of behavioral pattern 200, the liquidity management platform may determine that the account associated with behavioral pattern 200 is to be classified in a funding account type cluster based on the spatial features. Furthermore, the liquidity management platform may determine a prediction for the balance of the account over a future time period using a model that is associated with the funding account type cluster and based on the spatial features.

As indicated above, FIG. 2 is provided merely as an example. Other examples may differ from what is described with regard to FIG. 2.

Figure 3:
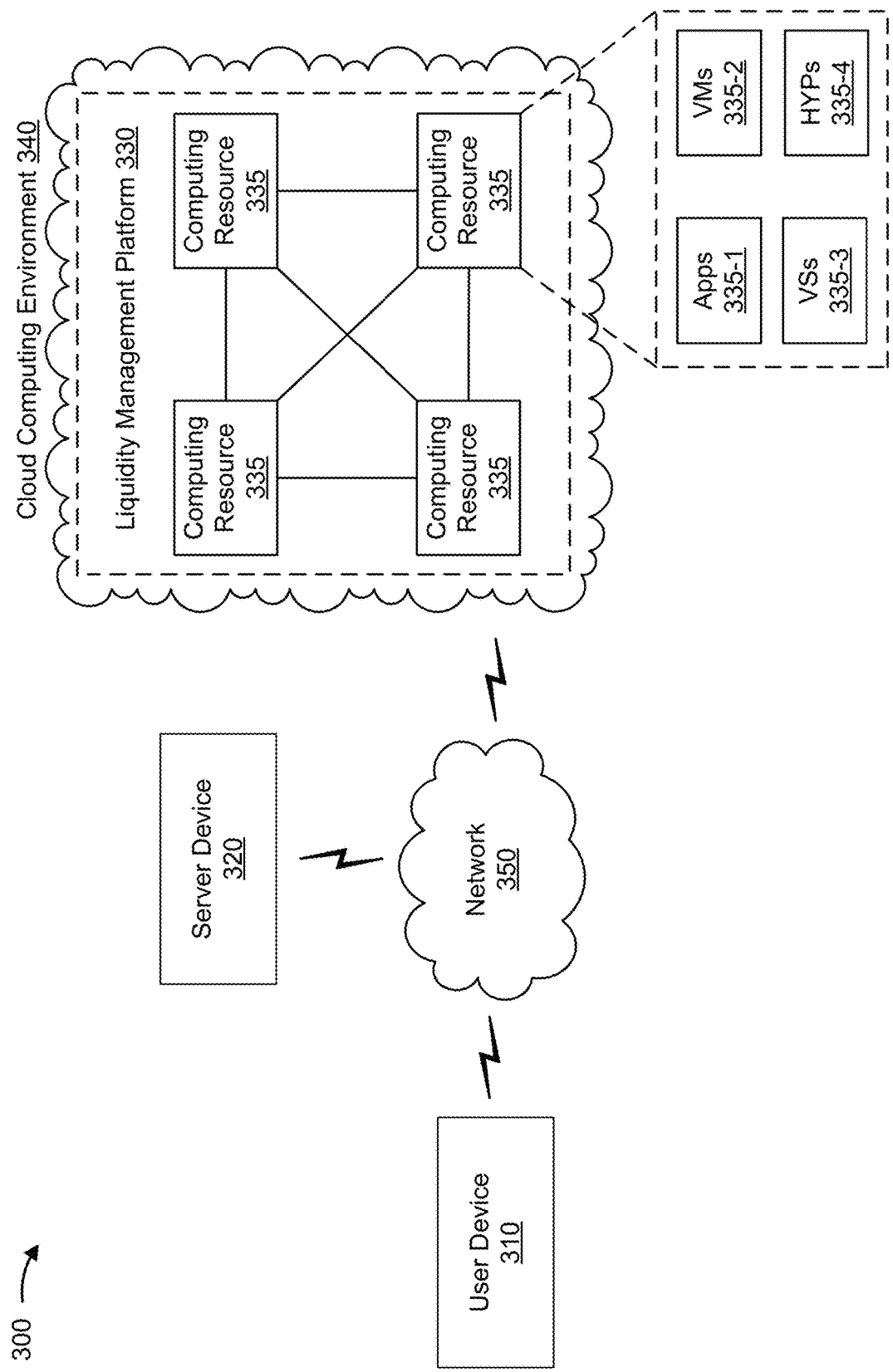
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a user device 310, a server device 320, a liquidity management platform 330, a computing resource 335, a cloud computing environment 340, and a network 350. Devices of environment 300 may interconnect via wired connections, wireless connections, or a combination of wired and wireless connections.

User device 310 includes one or more devices capable of receiving, generating, storing, processing, and/or providing information associated with account predictions. For example, user device 310 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Server device 320 includes one or more devices capable of storing, processing, and/or routing information associated with external data for training the prediction model. In some implementations, server device 320 may implement a liquidity management platform. In some implementations, server device 320 may include a communication interface that allows server device 320 to receive information from and/or transmit information to other devices in environment 300.

Liquidity management platform 330 includes one or more computing resources assigned to generate data relating to an account and determine a prediction for a balance of the account. For example, liquidity management platform 330 may be a platform implemented by cloud computing environment 340 that may determine a behavioral pattern for an account, determine relationships or associations between accounts, determine anomalous behavior in the behavioral pattern, determine an account type cluster for the account, predict an amount of funds that is likely to remain in the account, and/or the like. In some implementations, liquidity management platform 330 is implemented by computing resources 335 of cloud computing environment 340.

Liquidity management platform 330 may include a server device or a group of server devices. In some implementations, liquidity management platform 330 may be hosted in cloud computing environment 340. Notably, while implementations described herein may describe liquidity management platform 330 as being hosted in cloud computing environment 340, in some implementations, liquidity management platform 330 may be non-cloud-based or may be partially cloud-based.

Cloud computing environment 340 includes an environment that delivers computing as a service, whereby shared resources, services, and/or the like may be provided to user device 310, server device 320, and/or the like. Cloud computing environment 340 may provide computation, software, data access, storage, and/or other services that do not require end-user knowledge of a physical location and configuration of a system and/or a device that delivers the services. As shown, cloud computing environment 340 may include liquidity management platform 330 and computing resource 335.

Computing resource 335 includes one or more personal computers, workstation computers, server devices, or another type of computation and/or communication device. In some implementations, computing resource 335 may host liquidity management platform 330. The cloud resources may include compute instances executing in computing resource 335, storage devices provided in computing resource 335, data transfer devices provided by computing resource 335, and/or the like. In some implementations, computing resource 335 may communicate with other computing resources 335 via wired connections, wireless connections, or a combination of wired and wireless connections.

As further shown in FIG. 3, computing resource 335 may include a group of cloud resources, such as one or more applications ("APPs") 335-1, one or more virtual machines ("VMs") 335-2, virtualized storage ("VSs") 335-3, one or more hypervisors ("HYPs") 335-4, or the like.

Application 335-1 includes one or more software applications that may be provided to or accessed by user device 310, server device 320, and/or the like. Application 335-1 may eliminate a need to install and execute the software applications on user device 310, server device 320, and/or the like. For example, application 335-1 may include software associated with liquidity management platform 330 and/or any other software capable of being provided via cloud computing environment 340. In some implementations, one application 335-1 may send/receive information to/from one or more other applications 335-1, via virtual machine 335-2.

Virtual machine 335-2 includes a software implementation of a machine (e.g., a computer) that executes programs like a physical machine. Virtual machine 335-2 may be either a system virtual machine or a process virtual machine, depending upon use and degree of correspondence to any real machine by virtual machine 335-2. A system virtual machine may provide a complete system platform that supports execution of a complete operating system ("OS"). A process virtual machine may execute a single program and may support a single process. In some implementations, virtual machine 335-2 may execute on behalf of a user, and may manage infrastructure of cloud computing environment 340, such as data management, synchronization, or long-duration data transfers.

Virtualized storage 335-3 includes one or more storage systems and/or one or more devices that use virtualization techniques within the storage systems or devices of computing resource 335. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 335-4 provides hardware virtualization techniques that allow multiple operating systems (e.g., "guest operating systems") to execute concurrently on a host computer, such as computing resource 335. Hypervisor 335-4 may present a virtual operating platform to the guest operating systems and may manage the execution of the guest operating systems. Multiple instances of a variety of operating systems may share virtualized hardware resources.

Network 350 includes one or more wired and/or wireless networks. For example, network 350 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The quantity and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
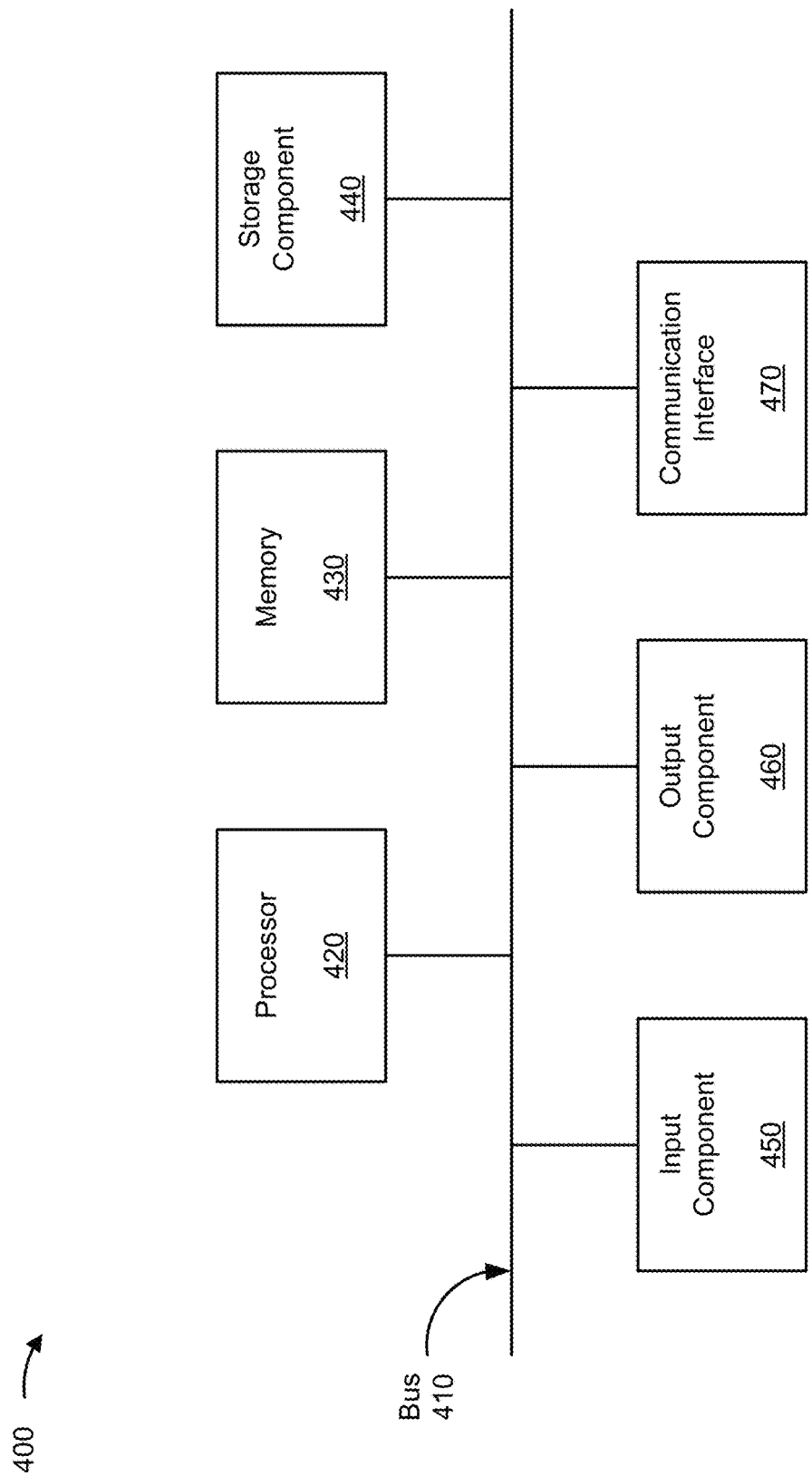
FIG. 4 is a diagram of example components of one or more devices of FIG. 3.

FIG. 4 is a diagram of example components of a device 400. Device 400 may correspond to user device 310, server device 320, liquidity management platform 330, and/or computing resource 335. In some implementations, user device 310, server device 320, liquidity management platform 330, and/or computing resource 335 may include one or more devices 400 and/or one or more components of device 400. As shown in FIG. 4, device 400 may include a bus 410, a processor 420, a memory 430, a storage component 440, an input component 450, an output component 460, and/or a communication interface 470.

Bus 410 includes a component that permits communication among multiple components of device 400. Processor 420 is implemented in hardware, firmware, and/or a combination of hardware and software. Processor 420 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The quantity and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
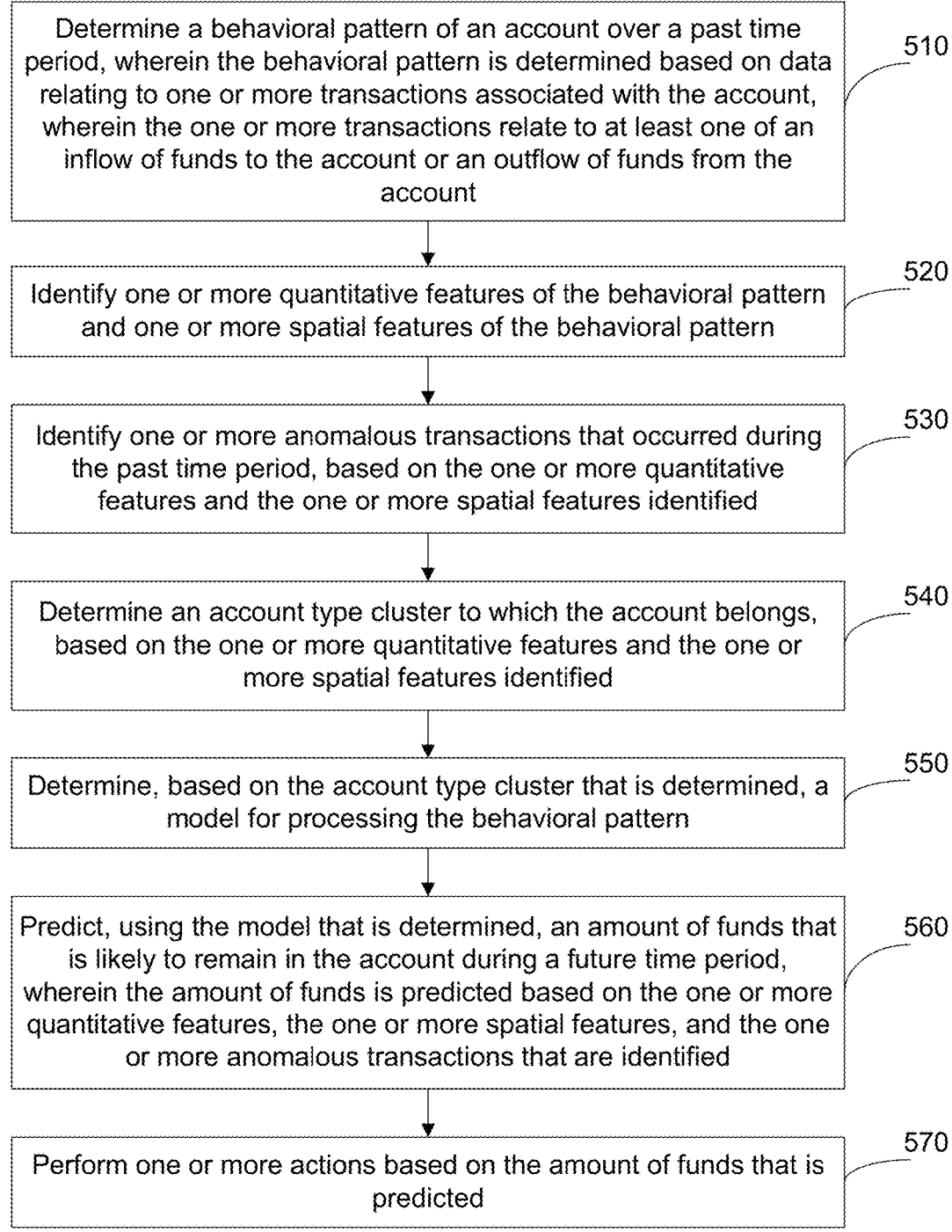
FIGS. 5-7 are flow charts of example processes for liquidity management.

FIG. 5 is a flow chart of an example process 500 for liquidity management. In some implementations, one or more process blocks of FIG. 5 may be performed by a liquidity management platform (e.g., liquidity management platform 330). In some implementations, one or more process blocks of FIG. 5 may be performed by another device or a group of devices separate from or including the liquidity management platform, such as a user device (e.g., user device 310), a server device (e.g., server device 320), and/or the like.

As shown in FIG. 5, process 500 may include determining a behavioral pattern of an account over a past time period, wherein the behavioral pattern is determined based on data relating to one or more transactions associated with the account, and wherein the one or more transactions relate to at least one of an inflow of funds to the account or an outflow of funds from the account (block 510). For example, the liquidity management platform (e.g., using processor 420, memory 430, storage component 440, and/or the like) may determine a behavioral pattern of an account over a past time period, as described above. In some implementations, the behavioral pattern may be determined based on data relating to one or more transactions associated with the account. In some implementations, the one or more transactions may relate to at least one of an inflow of funds to the account or an outflow of funds from the account.

As further shown in FIG. 5, process 500 may include identifying one or more quantitative features of the behavioral pattern and one or more spatial features of the behavioral pattern (block 520). For example, the liquidity management platform (e.g., using processor 420, memory 430, storage component 440, and/or the like) may identify one or more quantitative features of the behavioral pattern and one or more spatial features of the behavioral pattern, as described above.

As further shown in FIG. 5, process 500 may include identifying one or more anomalous transactions that occurred during the past time period, based on the one or more quantitative features and the one or more spatial features identified (block 530). For example, the liquidity management platform (e.g., using processor 420, memory 430, storage component 440, and/or the like) may identify one or more anomalous transactions that occurred during the past time period, based on the one or more quantitative features and the one or more spatial features identified, as described above.

As further shown in FIG. 5, process 500 may include determining an account type cluster to which the account belongs, based on the one or more quantitative features and the one or more spatial features identified (block 540). For example, the liquidity management platform (e.g., using processor 420, memory 430, storage component 440, and/or the like) may determine an account type cluster to which the account belongs, based on the one or more quantitative features and the one or more spatial features identified, as described above.

As further shown in FIG. 5, process 500 may include determining, based on the account type cluster that is determined, a model for processing the behavioral pattern (block 550). For example, the liquidity management platform (e.g., using processor 420, memory 430, storage component 440, and/or the like) may determine, based on the account type cluster that is determined, a model for processing the behavioral pattern, as described above.

As further shown in FIG. 5, process 500 may include predicting, using the model that is determined, an amount of funds that is likely to remain in the account during a future time period, wherein the amount of funds is predicted based on at least one of the one or more quantitative features, the one or more spatial features, and the one or more anomalous transactions that are identified (block 560). For example, the liquidity management platform (e.g., using processor 420, memory 430, storage component 440, and/or the like) may predict, using the model that is determined, an amount of funds that is likely to remain in the account during a future time period, as described above. In some implementations, the amount of funds may be predicted based on the one or more quantitative features, the one or more spatial features, and the one or more anomalous transactions that are identified.

As further shown in FIG. 5, process 500 may include performing one or more actions based on the amount of funds that is predicted (block 570). For example, the liquidity management platform (e.g., using processor 420, memory 430, storage component 440, input component 450, output component 460, communication interface 470, and/or the like) may perform one or more actions based on the amount of funds that is predicted, as described above.

Process 500 may include additional implementations, such as any single implementation or any combination of implementations described below and/or in connection with one or more other processes described elsewhere herein.

In a first implementation, the one or more quantitative features of the behavioral pattern may relate to one or more of: a quantity of the one or more transactions, a quantity of inflows of funds that occurred before an outflow of funds occurred during a portion of the past time period, or a quantity of outflows of funds that occurred before an inflow of funds occurred during a portion of the past time period. In a second implementation, alone or in combination with the first implementation, the one or more spatial features of the behavioral pattern may relate to one or more of: a slope direction over a portion of the behavioral pattern, a slope degree over a portion of the behavioral pattern, or a radius of curvature over a portion of the behavioral pattern.

In a third implementation, alone or in combination with one or more of the first and second implementations, performing the one or more actions may include providing information to an entity identifying the amount of funds that is predicted, in order to permit the entity to select a portion of the amount of funds as a liquidity buffer, or determining a portion of the amount of funds as a liquidity buffer based on rules associated with the entity.

In a fourth implementation, alone or in combination with one or more of the first through third implementations, predicting the amount of funds that is likely to remain in the account during the future time period may include predicting the amount of funds that is likely to remain in the account during the future time period and a quantity of transactions of the account that is likely to occur during the future time period. In such a case, performing the one or more actions may include providing information to the entity identifying the amount of funds and the quantity of transactions that are predicted, in order to permit the entity to select the portion of the amount of funds as the liquidity buffer.

In a fifth implementation, alone or in combination with one or more of the first through fourth implementations, identifying the one or more anomalous transactions may include determining moving standard deviation values of an account balance of the account over the past time period, determining respective z-scores for the moving standard deviation values, and identifying an anomalous transaction at a time point associated with a z-score that satisfies a threshold value.

In a sixth implementation, alone or in combination with one or more of the first through fifth implementations, the liquidity management platform may determine one or more associated accounts of the account based on the behavioral pattern, where an associated account provides an inflow of funds to the account or receives an outflow of funds from the account, and determine an aggregated prediction based on the amount of funds that is predicted for the account and amounts of funds that are predicted for the associated accounts.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
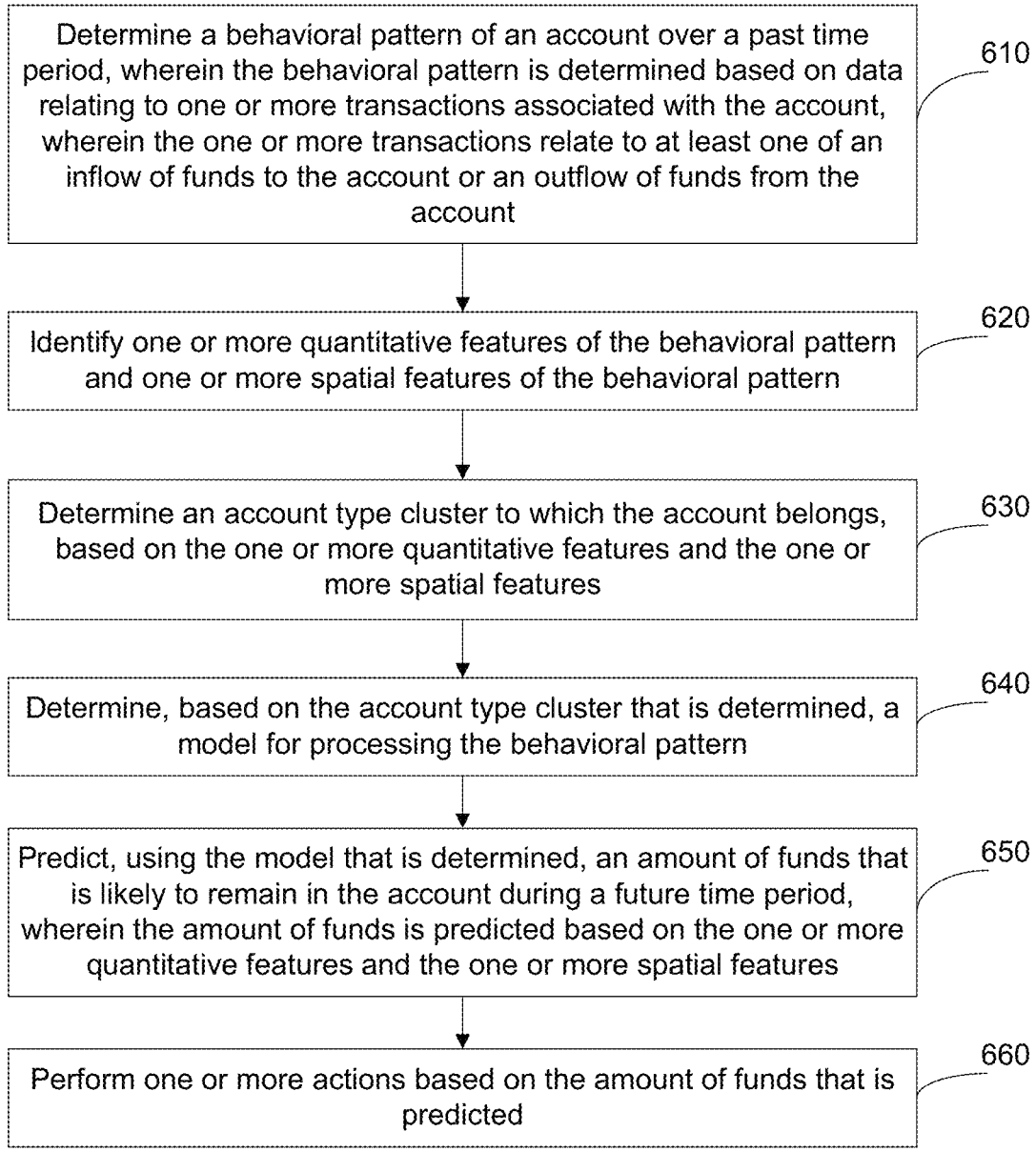

FIG. 6 is a flow chart of an example process 600 for liquidity management. In some implementations, one or more process blocks of FIG. 6 may be performed by a liquidity management platform (e.g., liquidity management platform 330). In some implementations, one or more process blocks of FIG. 6 may be performed by another device or a group of devices separate from or including the liquidity management platform, such as a user device (e.g., user device 310), a server device (e.g., server device 320), and/or the like.

As shown in FIG. 6, process 600 may include determining a behavioral pattern of an account over a past time period, wherein the behavioral pattern is determined based on data relating to one or more transactions associated with the account, and wherein the one or more transactions relate to at least one of an inflow of funds to the account or an outflow of funds from the account (block 610). For example, the liquidity management platform (e.g., using processor 420, memory 430, storage component 440, and/or the like) may determine a behavioral pattern of an account over a past time period, as described above. In some implementations, the behavioral pattern may be determined based on data relating to one or more transactions associated with the account. In some implementations, the one or more transactions may relate to at least one of an inflow of funds to the account or an outflow of funds from the account.

As further shown in FIG. 6, process 600 may include identifying one or more quantitative features of the behavioral pattern and one or more spatial features of the behavioral pattern (block 620). For example, the liquidity management platform (e.g., using processor 420, memory 430, storage component 440, and/or the like) may identify one or more quantitative features of the behavioral pattern and one or more spatial features of the behavioral pattern, as described above.

As further shown in FIG. 6, process 600 may include determining an account type cluster to which the account belongs, based on the one or more quantitative features and the one or more spatial features (block 630). For example, the liquidity management platform (e.g., using processor 420, memory 430, storage component 440, and/or the like) may determine an account type cluster to which the account belongs, based on the one or more quantitative features and the one or more spatial features, as described above.

As further shown in FIG. 6, process 600 may include determining, based on the account type cluster that is determined, a model for processing the behavioral pattern (block 640). For example, the liquidity management platform (e.g., using processor 420, memory 430, storage component 440, and/or the like) may determine, based on the account type cluster that is determined, a model for processing the behavioral pattern, as described above.

As further shown in FIG. 6, process 600 may include predicting, using the model that is determined, an amount of funds that is likely to remain in the account during a future time period, wherein the amount of funds is predicted based on the one or more quantitative features and the one or more spatial features (block 650). For example, the liquidity management platform (e.g., using processor 420, memory 430, storage component 440, and/or the like) may predict, using the model that is determined, an amount of funds that is likely to remain in the account during a future time period, as described above. In some implementations, the amount of funds may be predicted based on the one or more quantitative features and the one or more spatial features.

As further shown in FIG. 6, process 600 may include performing one or more actions based on the amount of funds that is predicted (block 660). For example, the liquidity management platform (e.g., using processor 420, memory 430, storage component 440, input component 450, output component 460, communication interface 470, and/or the like) may perform one or more actions based on the amount of funds that is predicted, as described above.

Process 600 may include additional implementations, such as any single implementation or any combination of implementations described below and/or in connection with one or more other processes described elsewhere herein.

In a first implementation, the one or more quantitative features of the behavioral pattern may relate to one or more of: a quantity of the one or more transactions, a quantity of inflows of funds that occurred before an outflow of funds occurred during a portion of the past time period, or a quantity of outflows of funds that occurred before an inflow of funds occurred during a portion of the past time period; and the one or more spatial features of the behavioral pattern may relate to one or more of: a slope direction over a portion of the behavioral pattern, a slope degree over a portion of the behavioral pattern, or a radius of curvature over a portion of the behavioral pattern.

In a second implementation, alone or in combination with the first implementation, the liquidity management platform when performing the one or more actions, may provide information to an entity identifying the amount of funds that is predicted, in order to permit the entity to select a portion of the amount of funds as a liquidity buffer, or determine a portion of the amount of funds as a liquidity buffer based on rules associated with the entity.

In a third implementation, alone or in combination with one or more of the first and second implementations, the liquidity management platform, when predicting the amount of funds, may predict the amount of funds using at least one of an autoregressive integrated moving average (ARIMA) model, a deep learning model, or a forecasting model. In a fourth implementation, alone or in combination with one or more of the first through third implementations, the liquidity management platform, when predicting the amount of funds, may determine one or more anomalous transactions that are likely to occur during the future time period and a degree by which the one or more anomalous transactions are likely to affect the amount of funds, and predict the amount of funds based on the one or more quantitative features, the one or more spatial features, and the degree by which the one or more anomalous transactions are likely to affect the amount of funds.

In a fifth implementation, alone or in combination with one or more of the first through fourth implementations, the account type cluster may relate to one of: a payroll account type cluster, a funding account type cluster, a volatile account type cluster, or a saving account type cluster. In a sixth implementation, alone or in combination with one or more of the first through fifth implementations, the liquidity management platform, when determining the account type cluster, may determine the account type cluster using at least one of a k-means clustering technique or a k-shape clustering technique.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
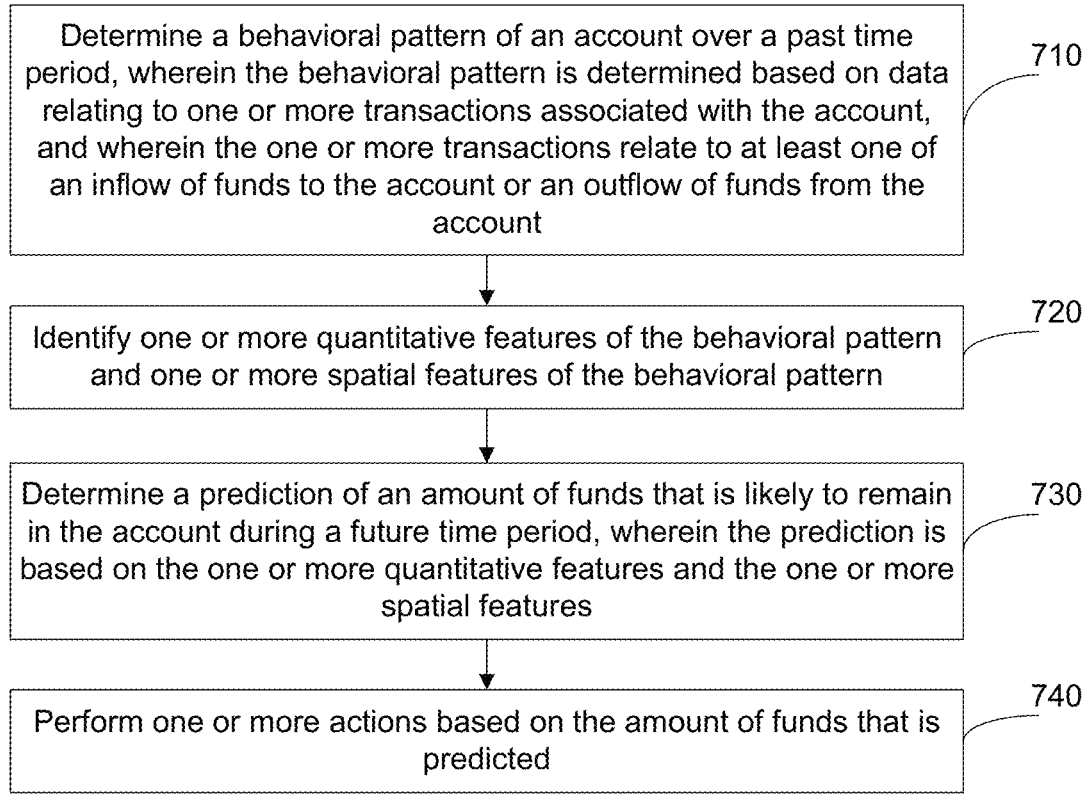

FIG. 7 is a flow chart of an example process 700 for liquidity management. In some implementations, one or more process blocks of FIG. 7 may be performed by a liquidity management platform (e.g., liquidity management platform 330). In some implementations, one or more process blocks of FIG. 7 may be performed by another device or a group of devices separate from or including the liquidity management platform, such as a user device (e.g., user device 310), a server device (e.g., server device 320), and/or the like.

As shown in FIG. 7, process 700 may include determining a behavioral pattern of an account over a past time period, wherein the behavioral pattern is determined based on data relating to one or more transactions associated with the account, and wherein the one or more transactions relate to at least one of an inflow of funds to the account or an outflow of funds from the account (block 710). For example, the liquidity management platform (e.g., using processor 420, memory 430, storage component 440, and/or the like) may determine a behavioral pattern of an account over a past time period, as described above. In some implementations, the behavioral pattern may be determined based on data relating to one or more transactions associated with the account. In some implementations, the one or more transactions may relate to at least one of an inflow of funds to the account or an outflow of funds from the account.

As further shown in FIG. 7, process 700 may include identifying one or more quantitative features of the behavioral pattern and one or more spatial features of the behavioral pattern (block 720). For example, the liquidity management platform (e.g., using processor 420, memory 430, storage component 440, and/or the like) may identify one or more quantitative features of the behavioral pattern and one or more spatial features of the behavioral pattern, as described above.

As further shown in FIG. 7, process 700 may include determining a prediction of an amount of funds that is likely to remain in the account during a future time period, wherein the prediction is based on the one or more quantitative features and the one or more spatial features (block 730). For example, the liquidity management platform (e.g., using processor 420, memory 430, storage component 440, and/or the like) may determine a prediction of an amount of funds that is likely to remain in the account during a future time period, as described above. In some implementations, the prediction is based on the one or more quantitative features and the one or more spatial features.

As further shown in FIG. 7, process 700 may include performing one or more actions based on the amount of funds that is predicted (block 740). For example, the liquidity management platform (e.g., using processor 420, memory 430, storage component 440, input component 450, output component 460, communication interface 470, and/or the like) may perform one or more actions based on the amount of funds that is predicted, as described above.

Process 700 may include additional implementations, such as any single implementation or any combination of implementations described below and/or in connection with one or more other processes described elsewhere herein.

In a first implementation, the liquidity management platform, when determining the prediction, may determine the prediction using an unsupervised machine learning technique. In a second implementation, alone or in combination with the first implementation, the one or more quantitative features of the behavioral pattern may relate to one or more of: a quantity of the one or more transactions, a quantity of inflows of funds that occurred before an outflow of funds occurred during a portion of the past time period, or a quantity of outflows of funds that occurred before an inflow of funds occurred during a portion of the past time period; and the one or more spatial features of the behavioral pattern may relate to one or more of: a slope direction over a portion of the behavioral pattern, a slope degree over a portion of the behavioral pattern, or a radius of curvature over a portion of the behavioral pattern.

In a third implementation, alone or in combination with one or more of the first and second implementations, the liquidity management platform may identify one or more anomalous transactions that occurred during the past time period, based on the one or more quantitative features and the one or more spatial features identified, and the prediction may be based on the one or more quantitative features, the one or more spatial features, and the one or more anomalous transactions.

In a fourth implementation, alone or in combination with one or more of the first through third implementations, the account may be associated with an account type cluster that includes one or more behaviorally-related accounts to the account. The liquidity management platform may associate the one or more behaviorally-related accounts with the prediction determined for the account.

In a fifth implementation, alone or in combination with one or more of the first through fourth implementations, the liquidity management platform, when performing the one or more actions, may provide information to an entity identifying the amount of funds that is predicted, in order to permit the entity to select a portion of the amount of funds as a liquidity buffer, or determine a portion of the amount of funds as a liquidity buffer based on rules associated with the entity.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    determining, by a device, a behavioral pattern of an account over a past time period,
        wherein the behavioral pattern is determined based on data relating to one or more transactions associated with the account,
            wherein the one or more transactions relate to at least one of an inflow of funds to the account or an outflow of funds from the account, and
        wherein the behavioral pattern is based on non-textual features of the account;
    identifying, by the device, one or more quantitative features of the behavioral pattern and one or more spatial features of the behavioral pattern;
    identifying, by the device, one or more anomalous transactions that occurred during the past time period based on the one or more quantitative features and the one or more spatial features identified;
    determining, by the device, an account type cluster to which the account belongs, based on the one or more quantitative features and the one or more spatial features identified;
    labeling, by the device, the account type cluster to which the account belongs;
    determining, by the device, and based on the account type cluster that is determined, a model for processing the behavioral pattern;
    predicting, by the device and using the model that is determined, an amount of funds that is likely to remain in the account during a future time period,
        wherein the amount of funds is predicted based on at least one of the one or more quantitative features, the one or more spatial features, and the one or more anomalous transactions that are identified;
    performing, by the device, one or more actions based on the amount of funds that is predicted;
    assigning, by the device, a second account to the account type cluster based on similarities in characteristics; and
    applying, by the device, the prediction to the second account.

2. The method of claim 1, wherein the one or more quantitative features of the behavioral pattern relate to one or more of:
   a quantity of the one or more transactions,
   a quantity of inflows of funds that occurred before an outflow of funds occurred during a portion of the past time period, or
   a quantity of outflows of funds that occurred before an inflow of funds occurred during a portion of the past time period.

3. The method of claim 1, wherein the one or more spatial features of the behavioral pattern relate to one or more of:
   a slope direction over a portion of the behavioral pattern,
   a slope degree over a portion of the behavioral pattern, or
   a radius of curvature over a portion of the behavioral pattern.

4. The method of claim 1, wherein performing the one or more actions includes:
   providing information to an entity identifying the amount of funds that is predicted, in order to permit the entity to select a portion of the amount of funds as a liquidity buffer, or
   determining a portion of the amount of funds as the liquidity buffer based on rules associated with the entity.

5. The method of claim 1, wherein predicting the amount of funds that is likely to remain in the account during the future time period comprises:
   predicting the amount of funds that is likely to remain in the account during the future time period and a quantity of transactions of the account that is likely to occur during the future time period; and
   wherein performing the one or more actions comprises:
   providing information to an entity identifying the amount of funds and the quantity of transactions that are predicted, in order to permit the entity to select a portion of the amount of funds as a liquidity buffer.

6. The method of claim 1, wherein identifying the one or more anomalous transactions comprises:
   determining moving standard deviation values of an account balance of the account over the past time period;
   determining respective z-scores for the moving standard deviation values; and
   identifying an anomalous transaction at a time point associated with a z-score that satisfies a threshold value.

7. The method of claim 1, further comprising:
   determining one or more associated accounts of the account based on the behavioral pattern,
     wherein an associated account of the one or more associated accounts provides an inflow of funds to the account or receives an outflow of funds from the account; and
   determining an aggregated prediction based on the amount of funds that is predicted for the account and amounts of funds that are predicted for the associated accounts.

8. A device, comprising:
   one or more memories; and
   one or more processors, communicatively coupled to the one or more memories, to:
     determine a behavioral pattern of an account over a past time period,
       wherein the behavioral pattern is determined based on data relating to one or more transactions associated with the account,
       wherein the one or more transactions relate to at least one of an inflow of funds to the account or an outflow of funds from the account, and
       wherein the behavioral pattern is based on non-textual features of the account;
     identify one or more quantitative features of the behavioral pattern and one or more spatial features of the behavioral pattern;
     identify one or more past anomalous transactions that occurred during the past time period based on the one or more quantitative features and the one or more spatial features;
     determine an account type cluster to which the account belongs, based on the one or more quantitative features and the one or more spatial features;
     label the account type cluster to which the account belongs;
     determine, based on the account type cluster that is determined, a model for processing the behavioral pattern;
     predict, using the model that is determined, an amount of funds that is likely to remain in the account during a future time period,
       wherein the amount of funds is predicted based on the one or more quantitative features, the one or more spatial features, and the one or more past anomalous transactions;
     perform, by the one or more processors, one or more actions based on the amount of funds that is predicted;
     assign, by the one or more processors, a second account to the account type cluster based on similarities in characteristics; and
     apply, by the one or more processors, the prediction to the second account.

9. The device of claim 8, wherein the one or more quantitative features of the behavioral pattern relate to one or more of:
   a quantity of the one or more transactions,
   a quantity of inflows of funds that occurred before an outflow of funds occurred during a portion of the past time period, or
   a quantity of outflows of funds that occurred before an inflow of funds occurred during a portion of the past time period; and
   wherein the one or more spatial features of the behavioral pattern relate to one or more of:
   a slope direction over a portion of the behavioral pattern,
   a slope degree over a portion of the behavioral pattern, or
   a radius of curvature over a portion of the behavioral pattern.

10. The device of claim 8, wherein the one or more processors, when performing the one or more actions, are to:
    provide information to an entity identifying the amount of funds that is predicted, in order to permit the entity to select a portion of the amount of funds as a liquidity buffer, or
    determine a portion of the amount of funds as the liquidity buffer based on rules associated with the entity.

11. The device of claim 8, wherein the one or more processors, when predicting the amount of funds, are to:
    predict the amount of funds using at least one of an autoregressive integrated moving average (ARIMA) model, a deep learning model, or a forecasting model.

12. The device of claim 8, wherein the one or more processors, when predicting the amount of funds, are to:

determine one or more anomalous transactions that are likely to occur during the future time period and a degree by which the one or more anomalous transactions are likely to affect the amount of funds; and predict the amount of funds based on the one or more quantitative features, the one or more spatial features, and the degree by which the one or more anomalous transactions are likely to affect the amount of funds.

13. The device of claim 8, wherein the account type cluster relates to one of:
   a payroll account type cluster,
   a funding account type cluster,
   a volatile account type cluster, or
   a saving account type cluster.

14. The device of claim 8, wherein the one or more processors, when determining the account type cluster, are to:
   determine the account type cluster using at least one of a k-means clustering technique or a k-shape clustering technique.

15. A non-transitory computer-readable medium storing instructions, the instructions comprising:
   one or more instructions that, when executed by one or more processors, cause the one or more processors to:
      determine a behavioral pattern of an account over a past time period,
         wherein the behavioral pattern is determined based on data relating to one or more transactions associated with the account,
            wherein the one or more transactions relate to at least one of an inflow of funds to the account or an outflow of funds from the account, and
         wherein the behavioral pattern is based on non-textual features of the account;
      identify one or more quantitative features of the behavioral pattern and one or more spatial features of the behavioral pattern;
      identify one or more anomalous transactions that occurred during the past time period based on the one or more quantitative features and the one or more spatial features;
      determine an account type cluster to which the account belongs, based on the one or more quantitative features and the one or more spatial features;
      label, based on the one or more quantitative features of the behavioral pattern and one or more spatial features of the behavioral pattern, the account type cluster to which the account belongs;
      determine a prediction of an amount of funds that is likely to remain in the account during a future time period,
         wherein the prediction is based on the one or more quantitative features, the one or more spatial features, and the one or more anomalous features;
      perform one or more actions based on the amount of funds that is predicted;
      assign a second account to the account type cluster based on similarities in characteristics; and
      apply the prediction to the second account.

16. The non-transitory computer-readable medium of claim 15, wherein the one or more instructions, that cause the one or more processors to determine the prediction, cause the one or more processors to determine the prediction using an unsupervised machine learning technique.

17. The non-transitory computer-readable medium of claim 15, wherein the one or more quantitative features of the behavioral pattern relate to one or more of:
   a quantity of the one or more transactions,
   a quantity of inflows of funds that occurred before an outflow of funds occurred during a portion of the past time period, or
   a quantity of outflows of funds that occurred before an inflow of funds occurred during a portion of the past time period; and
   wherein the one or more spatial features of the behavioral pattern relate to one or more of:
      a slope direction over a portion of the behavioral pattern,
      a slope degree over a portion of the behavioral pattern, or
      a radius of curvature over a portion of the behavioral pattern.

18. The non-transitory computer-readable medium of claim 15, wherein the account is associated with an account type cluster,
   wherein the account type cluster includes one or more behaviorally-related accounts to the account,
   wherein the one or more instructions, when executed by the one or more processors, further cause the one or more processors to:
      associate the one or more behaviorally-related accounts with the prediction determined for the account.

19. The non-transitory computer-readable medium of claim 15, wherein the one or more instructions, that cause the one or more processors to perform the one or more actions, cause the one or more processors to:
   provide information to an entity identifying the amount of funds that is predicted, in order to permit the entity to select a portion of the amount of funds as a liquidity buffer, or
   determine a portion of the amount of funds as the liquidity buffer based on rules associated with the entity.

20. The non-transitory computer-readable medium of claim 15, wherein the one or more instructions further cause the one or more processors to:
   determine one or more associated accounts of the account based on the behavioral pattern,
      wherein an associated account of the one or more associated accounts provides an inflow of funds to the account or receives an outflow of funds from the account; and
   determine an aggregated prediction based on the amount of funds that is predicted for the account and amounts of funds that are predicted for the associated accounts.

* * * * *